United States Patent
Bozek et al.

(10) Patent No.: US 8,478,961 B2
(45) Date of Patent: Jul. 2, 2013

(54) DYNAMIC MIGRATION OF VIRTUAL MACHINES BASED ON WORKLOAD CACHE DEMAND PROFILING

(75) Inventors: James J. Bozek, Bothell, WA (US); Nils Peter Joachim Hansson, Monroe, WA (US); Edward S. Suffern, Chapel Hill, NC (US); James L. Wooldridge, Fall City, WA (US)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 13/038,474

(22) Filed: Mar. 2, 2011

(65) Prior Publication Data

US 2012/0226866 A1 Sep. 6, 2012

(51) Int. Cl.
*G06F 12/00* (2006.01)
(52) U.S. Cl.
USPC ............................. 711/165; 711/6; 711/118
(58) Field of Classification Search
USPC .............................................. 711/6, 118, 165
See application file for complete search history.

(56) References Cited

U.S. PATENT DOCUMENTS

| | | |
|---|---|---|
| 6,493,810 B1 | 12/2002 | Pang et al. |
| 6,622,221 B1 | 9/2003 | Zahavi |
| 6,947,992 B1 | 9/2005 | Shachor |
| 2009/0313445 A1 | 12/2009 | Pandey et al. |

OTHER PUBLICATIONS

Marty, et al. "Virtual Hierarchies to Support Server Consolidation", Computer Science Department, University of Wisconsin-Madison, pp. 1-11. dated 2007.

*Primary Examiner* — Reginald Bragdon
*Assistant Examiner* — Gurtej Bansal
(74) *Attorney, Agent, or Firm* — Cynthia G. Seal; Jeffrey L. Streets

(57) ABSTRACT

A computer-implemented method comprises obtaining a cache hit ratio for each of a plurality of virtual machines, and identifying, from among the plurality of virtual machines, a first virtual machine having a cache hit ratio that is less than a threshold ratio. The identified first virtual machine is then migrated from the first physical server having a first cache size to a second physical server having a second cache size that is greater than the first cache size. Optionally, a virtual machine having a cache hit ratio that is less than a threshold ratio is identified on a class-specific basis, such as for L1 cache, L2 cache and L3 cache.

25 Claims, 10 Drawing Sheets

PHYSICAL SERVER 1

| VM | | COUNTER | HIT RATIO | THRESHOLD |
|---|---|---|---|---|
| VM1 | L1 HITS | 800 | .80 | .75 |
| | L2 HITS | 160 | .80 | .75 |
| | L3 HITS | 10 | .25 | .75 |
| | MEMORY ACESSES | 1000 | – | – |
| VM2 | | | | |
| ⋮ | | | | |
| VMn | | | | |

PHYSICAL SERVER 1

| VM | | COUNTER | HIT RATIO | THRESHOLD |
|---|---|---|---|---|
| VM1 | L1 HITS<br>L2 HITS<br>L3 HITS<br>MEMORY ACESSES | 800<br>160<br>10<br>1000 | .80<br>.80<br>.25<br>– | .75<br>.75<br>.75<br>– |
| VM2 | | | | |
| ⋮ | | | | |
| VMn | | | | |

FIG. 7

VM1 → PHYSICAL SERVER #

| | 1 | 2 | 3 | 4 | 5 | 6 |
|---|---|---|---|---|---|---|
| L1 | .25 | .25 | .25 | .25 | .50 | .50 |
| L2 | .50 | .25 | .50 | .50 | 1 | .50 |
| L3 | 1 | .50 | .50 | 1 | 1 | 2 |
| MAIN MEMORY | 16 | 32 | 16 | 64 | 64 | 32 |

VPD TABLE (GB capacity)

FIG. 8

DYNAMIC MIGRATION OF VIRTUAL MACHINES BASED ON WORKLOAD CACHE DEMAND PROFILING

BACKGROUND

1. Field of the Invention

The present invention relates to the management of virtual machines. More specifically, the present invention relates to management of the system resources in a virtual machine environment.

2. Background of the Related Art

Cache is a computer system component on which data can be stored on behalf of a storage device such as a DIMM or a hard disk drive, and from which data may be accessed faster than from the storage device. Cache generally has much less capacity than the corresponding storage device, and is therefore used to store data that is likely to be requested again, such as the more relevant or more recent data. Several different layers of cache may be provided in a modern computer system. Level 1 (or primary) cache, for example, is used to store data on behalf of system memory (which comprises random access memory, i.e. RAM) for access by a processor. Level 1 cache can be built directly into the processor and can run at the same speed as the processor, providing the fastest possible access time. Level 2 (or secondary) cache is also used to store a portion of system memory and may be included within a chip package, but is separate from the processor. Level 2 cache has greater capacity than Level 1 cache, but is slower. Some systems may even include Level 3 cache that has even greater capacity than Level 2 cache. However, Level 3 cache is typically slower than Level 2 cache, yet still faster than the primary storage device, and may be located off the chip package.

Cache storage is used to increase the software execution performance by keeping the more frequent instructions and memory accesses locally in higher speed memory normally located on the processor chip. Locally storing the more frequently used memory locations reduces the need to go off chip to access memory using a slower speed bus therefore increasing the overall processing performance of the system. Also, cache is a more expensive commodity in the system. A Level 1 cache is more expensive than a Level 2 cache and so on. It is therefore important to maximize the usage (cache hit ratio) for the most expensive cache levels.

Before reading or writing data to a given location in main memory, a processor will determine whether that memory location is in the cache. This is determined by comparing the address of the memory location to all tags in the cache that might contain that address. A "cache hit" occurs when the memory location is in the cache, and a "cache miss" occurs when the memory location is not in the cache. A cache hit allows the processor to immediately read or write the data in the identified cache line. A cache miss requires that the processor to read or write the data from or to the main memory. The proportion of memory accesses that result in a cache hit is referred to as the "cache hit ratio", which is representative of the effectiveness of the cache for a particular program or process.

BRIEF SUMMARY

One embodiment of the present invention provides a computer-implemented method, comprising obtaining a cache hit ratio for each of a plurality of virtual machines; identifying, from among the plurality of virtual machines, a first virtual machine having a cache hit ratio that is less than a threshold ratio, wherein the first virtual machine is running on a first physical server; and migrating the first virtual machine from the first physical server having a first cache size to a second physical server having a second cache size that is greater than the first cache size.

Another embodiment of the present invention provides a computer program product including computer usable program code embodied on a computer usable storage medium. The computer program product comprises computer usable program code for obtaining a cache hit ratio for each of a plurality of virtual machines; computer usable program code for identifying, from among the plurality of virtual machines, a first virtual machine having a cache hit ratio that is less than a threshold ratio, wherein the first virtual machine is running on a first physical server; and computer usable program code for migrating the first virtual machine from the first physical server having a first cache size to a second physical server having a second cache size that is greater than the first cache size.

BRIEF DESCRIPTION OF THE SEVERAL VIEWS OF THE DRAWINGS

FIG. 7 is a diagram illustrating cache hit data maintained by a global provisioning manager for each virtual machine in a physical server.

FIG. 8 is a diagram illustrating vital product data for each of the physical servers in a migration domain.

DETAILED DESCRIPTION

Figure 1:
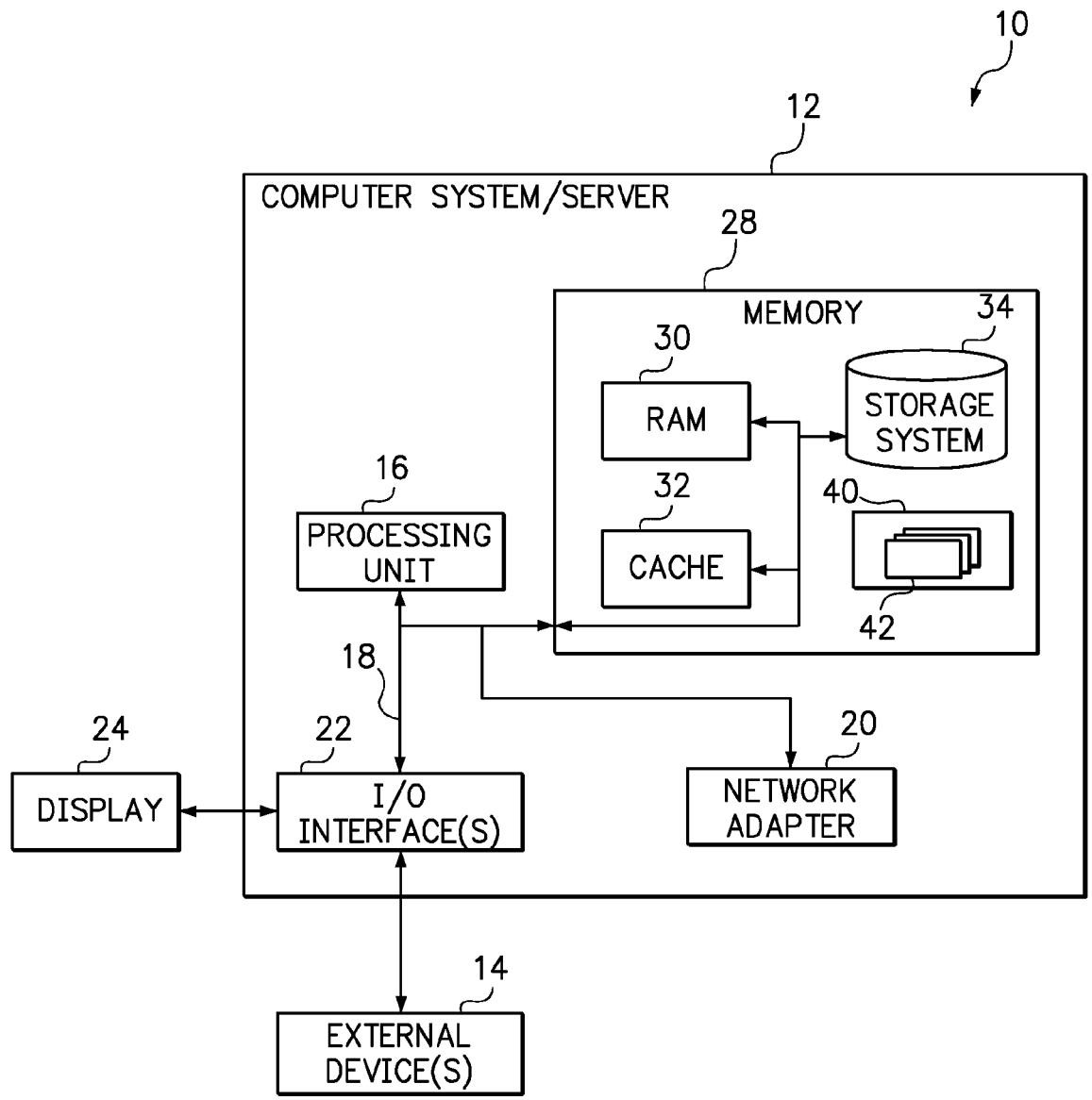
FIG. 1 depicts a cloud computing node according to an embodiment of the present invention.

One embodiment of the present invention provides a computer-implemented method, comprising obtaining a cache hit ratio for each of a plurality of virtual machines; identifying, from among the plurality of virtual machines, a first virtual machine having a cache hit ratio that is less than a threshold ratio, wherein the first virtual machine is running on a first physical server; and migrating the first virtual machine from the first physical server having a first cache size to a second physical server having a second cache size that is greater than the first cache size.

The "cache hit ratio" is the percentage of memory accesses that are available via the memory cache. A performance engineer or systems administrator can set a cache hit ratio threshold value, such that, for example, an individual virtual machine having a cache hit ratio less than the cache hit ratio threshold value is identified as a candidate for dynamic migration to another (target) physical server. In a first option, the cache hit ratio threshold value may be implemented according to an "absolute tolerance policy", in that a cache hit ratio landing outside of the tolerance range triggers a search for a better target physical server to run the virtual machine. In a second option, the cache hit ratio threshold value may be implemented according to a "relative tolerance policy", in that a virtual machine becomes a candidate for migration to another physical server if the virtual machine has a cache hit ratio that deviates more than a given percentage from the average cache hit ratio across a group of virtual machines. For example, an average cache hit ratio may be determined for all virtual machines, and the threshold ratio may be calculated as being a predetermined percentage below the average cache hit ratio. Accordingly, such a variable threshold ratio assures that only those virtual machines having the lowest cache hit ratios are selected for migration.

In one embodiment, a virtual machine having a cache hit ratio that is less than a threshold ratio is identified on a class-specific basis. Since a physical server will typically have multiple classes of cache, such as L1, L2 and L3 cache, it is possible, using certain chipsets, to determine or obtain a virtual machine's cache hit ratio for each cache class that is available on the physical server that is running the virtual machine. Accordingly, it is possible to determine that the performance of a given virtual machine is being limited by the size of a specific cache class on its current physical server. In a specific implementation, the method may further comprise obtaining a class-specific cache hit ratio for each of a plurality of cache classes available to the first virtual machine on the first physical server; and comparing, for each of the plurality of cache classes, the class-specific cache hit ratio to the threshold ratio, wherein the first virtual machine is identified as having a cache hit ratio that is less than the threshold ratio in response to determining that one or more of the class-specific cache hit ratios is less than the threshold ratio.

The class-specific cache hit ratio for a virtual machine is the percentage of memory accesses that are satisfied in a particular cache class versus the total number of memory accesses performed by the virtual machine during program execution. The percentage of memory accesses in the class-specific cache hit ratio are memory accesses available in the particular cache class excluding memory accesses satisfied by any subordinate cache. A cache is "subordinate" to another cache if it is checked for current data first. For example, an L1 is subordinate to an L2 cache, and an L2 cache is subordinate to L3 cache, because a processor trying to access a memory location will check the L1 cache first, then the L2 cache, and any L3 cache next, before accessing the main memory. Of course, once the memory location is found in the cache (i.e., there is a "hit"), the associated read or write operation may immediately proceed without further searching for the memory location. Embodiments of the present invention may focus on any one or more class-specific cache hit ratio as a virtual machine performance indicator that initiates a search for a better target physical server.

As described above, each of the class-specific cache hit ratios for a virtual machine may be compared to the threshold ratio, which may be a fixed ratio consistent with an absolute tolerance policy or a variable ratio consistent with a relative tolerance policy. However, a class-specific threshold ratio may be provided and used in the comparison with the class-specific cache hit ratios. Implementing a class-specific threshold ratio allows a different threshold ratio for each cache class. For example, an L1 threshold ratio, L2 threshold ratio, and L3 threshold ratio may be independently determined and used, whether the class-specific threshold ratio is fixed or variable. In one specific implementation, the method may include comparing, for each of the plurality of cache classes, the class-specific cache hit ratio to a class-specific threshold ratio for the same cache class, wherein a first virtual machine is identified as having a cache hit ratio that exceeds the threshold ratio in response to determining that one or more of the class-specific cache hit ratios is less than the class-specific threshold ratio for the same cache class. In other words, if the virtual machine has any class-specific cache hit ratio that is less than the corresponding class-specific threshold ratio, then it will trigger a search for a new target physical server. A class-specific threshold ratio may be either fixed or variable. In a specific implementation of a variable class-specific threshold ratio, a class-specific average cache hit ratio is determined considering all virtual machines within a migration domain, and the class-specific threshold ratio is then calculated as being a predetermined percentage below the class-specific average cache hit ratio.

A second (target) physical server may be selected to receive the first virtual machine from the first physical server, in response to determining that the second physical server has a greater amount of cache than the first physical server in the cache class having a class-specific cache hit ratio less than the threshold ratio. In other words, when the class-specific cache hit ratio for a first virtual machine on a first physical server is found to be less than the threshold ratio, the target physical server should have a greater amount of that same specific cache class.

In addition, the target physical server should have sufficient cache sizes so that, for all cache classes that are subordinate to the specific cache class experiencing the cache hit ratio threshold exception in the first (source) physical server, those subordinate caches of the target physical server are of equal or larger size as compared to the subordinate caches of the source physical server. For example, if a first virtual machine is running on a first physical server and experiences an L2 cache hit ratio that is less than an L2 cache hit threshold ratio (i.e., a cache hit ratio threshold exception), then a target physical server should have an L1 cache that is equal to or greater than the size of the L1 cache in the first physical server, and an L2 cache that is greater than the size of the L2 cache in the first physical server.

It should be recognized that the target physical server may be required to have additional attributes to satisfy additional aspects of a virtual machine migration policy. Such virtual machine migration policies may assure that the migration results in a net benefit, rather than merely avoiding one limitation only to raise another. For example, it is expected that a virtual machine will only be migrated if the target physical server is further determined to have sufficient memory and CPU bandwidth available to run the virtual machine. Both of these attributes can be determined in the virtualization management space. In addition, the target physical server must be within the migration domain of the source physical server, and fit within all existing migration policies in enabled by the management controller, such as security based dynamic migration policies and high availability migration sub-domains.

In another embodiment, cache size data is obtained for each of the physical servers within a migration domain. While the cache size data may be manually inputted by an administrator, the cache size data is preferably obtained from each physical server as vital product data.

In yet another embodiment, the method may further comprise migrating a second virtual machine off of the second physical server. This second migration may be implemented in recognition that the second physical server has fixed resources, including CPU bandwidth and main memory as well as cache size limitations. Accordingly, migration of a first virtual machine to the second physical server may be accompanied by a further migration of second virtual machine off of the second physical server. In one option, the second virtual machine is selected in response to determining that the second virtual machine has the lowest rate of memory accesses among all the virtual machines running on the second physical server. A virtual machine selected on this basis should run satisfactorily on a physical server having smaller cache.

Another embodiment of the present invention provides a computer program product including computer usable program code embodied on a computer usable storage medium, wherein the computer program product includes computer usable program code for performing any of the above methods. One computer program product comprises computer usable program code for obtaining a cache hit ratio for each of a plurality of virtual machines; computer usable program code for identifying, from among the plurality of virtual machines, a first virtual machine having a cache hit ratio that is less than a threshold ratio, wherein the first virtual machine is running on a first physical server; and computer usable program code for migrating the first virtual machine from the first physical server having a first cache size to a second physical server having a second cache size that is greater than the first cache size.

It should be understood that although this disclosure is applicable to cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
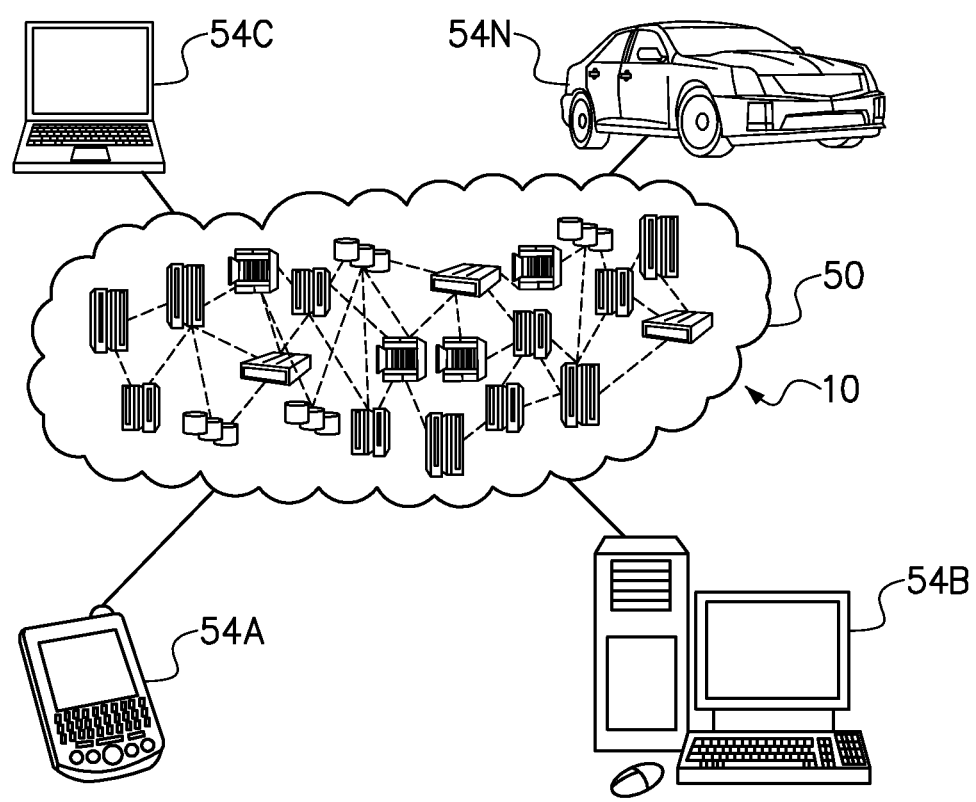
FIG. 2 depicts a cloud computing environment according to an embodiment of the present invention.

Referring now to FIG. 2, an illustrative cloud computing environment 50 is depicted. As shown, the cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
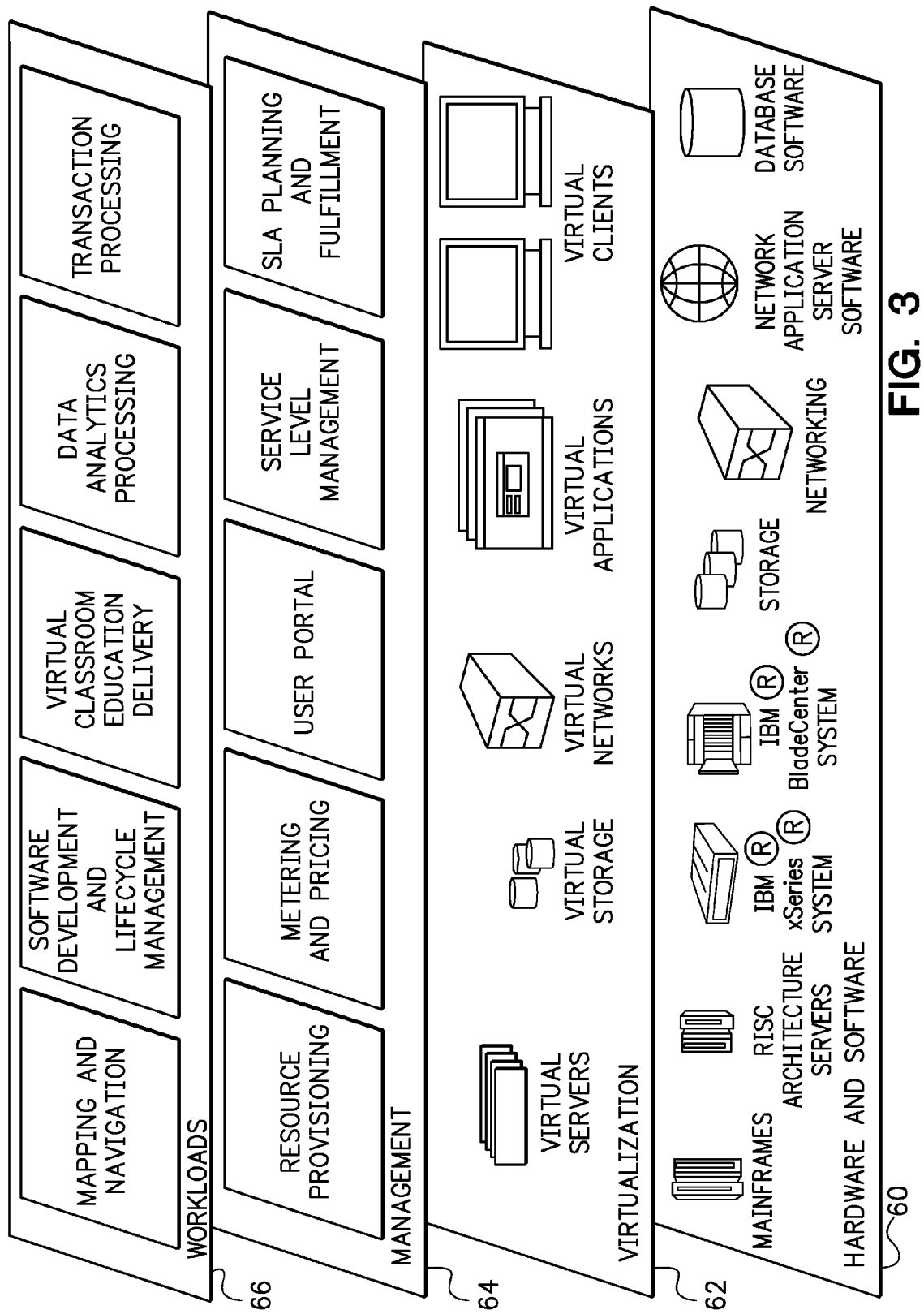
FIG. 3 depicts abstraction model layers according to an embodiment of the present invention.

Referring now to FIG. 3, a set of functional abstraction layers provided by cloud computing environment 50 (Shown in FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Figure 4:
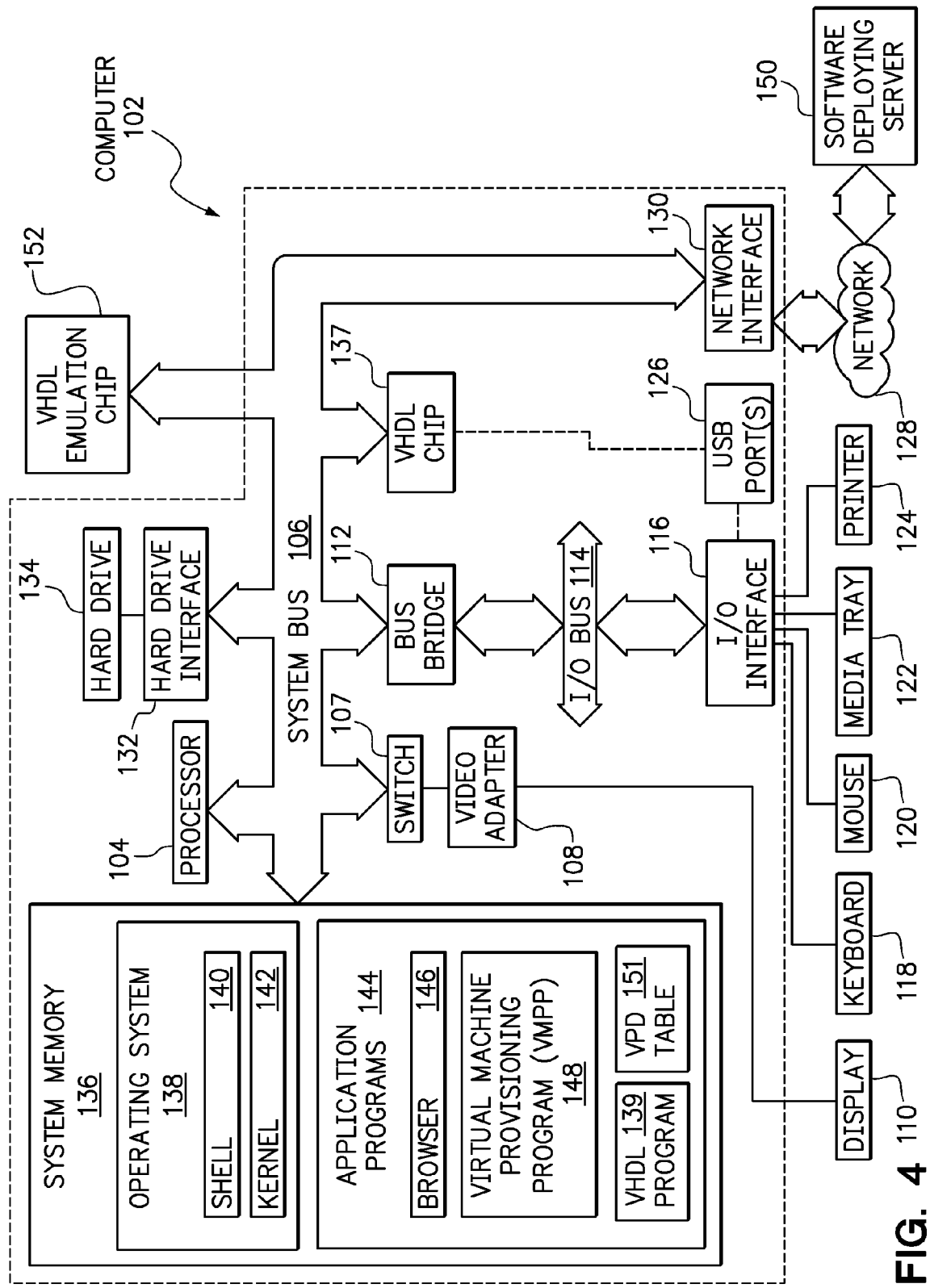
FIG. 4 depicts an exemplary computing node that may be utilized in accordance with one or more embodiments of the present invention.

FIG. 4 depicts an exemplary computing node (or simply "computer") 102 that may be utilized in accordance with one or more embodiments of the present invention. Note that some or all of the exemplary architecture, including both depicted hardware and software, shown for and within computer 102 may be utilized by the software deploying server 150, as well as the provisioning manager/management node 222 and the server blades 204a-n shown in FIG. 5. Note that while the server blades described in the present disclosure are described and depicted in exemplary manner as server blades in a blade chassis, some or all of the computers described herein may be stand-alone computers, servers, or other integrated or stand-alone computing devices. Thus, the terms "blade," "server blade," "computer," and "server" are used interchangeably in the present descriptions.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine provisioning program—VMPP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in the system memory of computer 102 (as well as the system memory of the software deploying server 150) also include a virtual machine provisioning program (VMPP) 148. VMPP 148 includes code for implementing the processes described below, including those described in FIGS. 2-8. VMPP 148 is able to communicate with a vital product data (VPD) table 151, which provides required VPD data described below. In one embodiment, the computer 102 is able to download VMPP 148 from software deploying server 150, including in an on-demand basis. Note further that, in one embodiment of the present invention, software deploying server 150 performs all of the functions associated with the present invention (including execution of VMPP 148), thus freeing computer 102 from having to use its own internal computing resources to execute VMPP 148.

Also stored in the system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMPP 148 causes the VHDL program 139 to configure the VHDL chip 137, which may be an FPGA, ASIC, or the like.

In another embodiment of the present invention, execution of instructions from VMPP 148 results in a utilization of VHDL program 139 to program a VHDL emulation chip 151. VHDL emulation chip 151 may incorporate a similar architecture as described above for VHDL chip 137. Once VMPP 148 and VHDL program 139 program VHDL emulation chip 151, VHDL emulation chip 151 performs, as hardware, some or all functions described by one or more executions of some or all of the instructions found in VMPP 148. That is, the VHDL emulation chip 151 is a hardware emulation of some or all of the software instructions found in VMPP 148. In one embodiment, VHDL emulation chip 151 is a programmable read only memory (PROM) that, once burned in accordance with instructions from VMPP 148 and VHDL program 139, is permanently transformed into a new circuitry that performs the functions needed to perform the processes of the present invention.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

A cloud computing environment allows a user workload to be assigned a virtual machine (VM) somewhere in the computing cloud. This virtual machine provides the software operating system and physical resources such as processing power and memory to support the user's application workload. The present disclosure describes methods for dynamically migrating virtual machine among physical servers based on the cache demand of the virtual machine workload. As described above, one of those methods comprises obtaining a cache hit ratio for each of a plurality of virtual machines; identifying, from among the plurality of virtual machines, a first virtual machine having a cache hit ratio that is less than a threshold ratio, wherein the first virtual machine is running on a first physical server; and migrating the first virtual machine from the first physical server having a first cache size to a second physical server having a second cache size that is greater than the first cache size.

Figure 5:
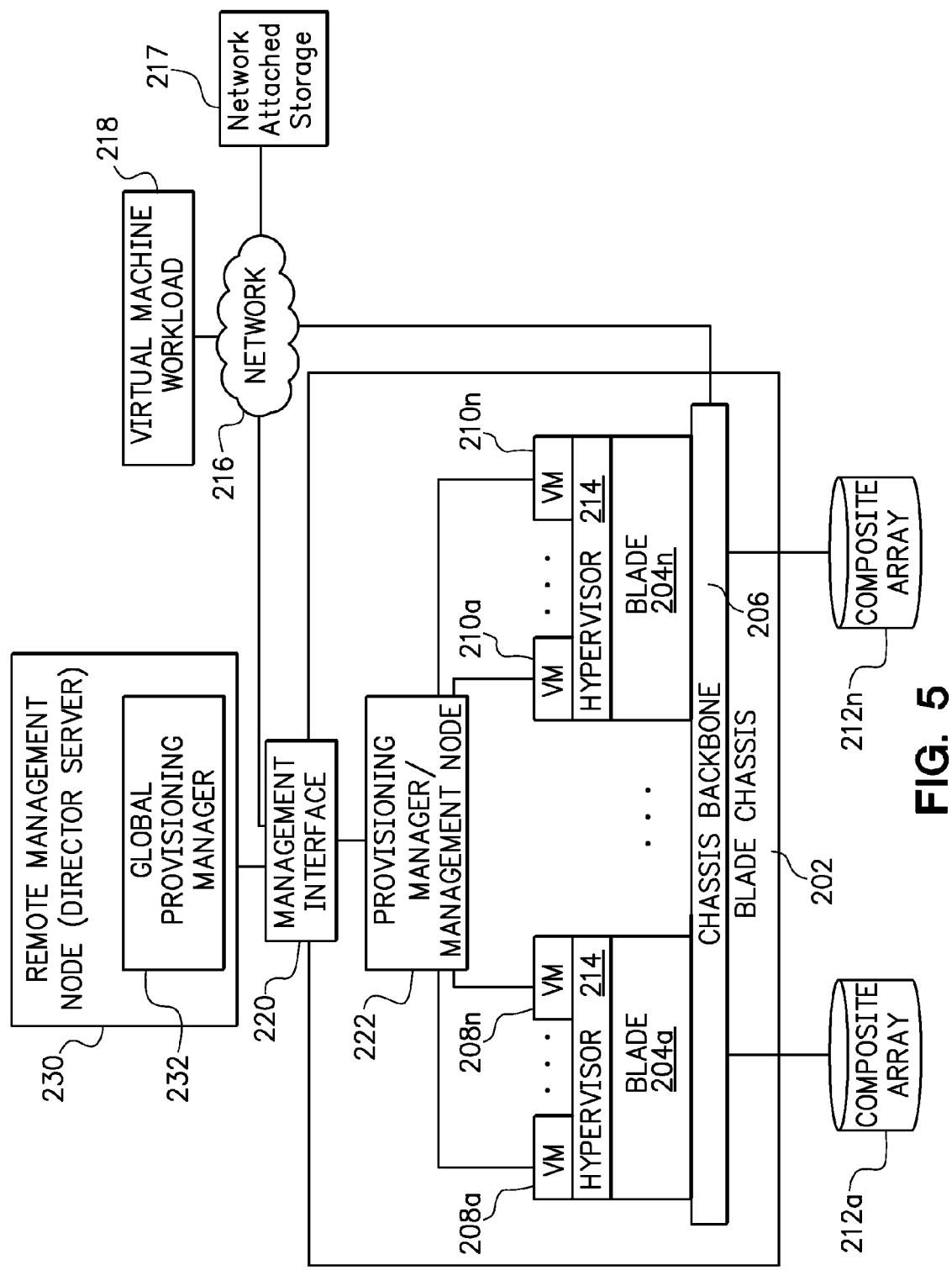
FIG. 5 depicts an exemplary blade chassis that may be utilized in accordance with one or more embodiments of the present invention.

FIG. 5 depicts an exemplary blade chassis that may be utilized in accordance with one or more embodiments of the present invention. The exemplary blade chassis 202 may operate in a "cloud" environment to provide a pool of resources. Blade chassis 202 comprises a plurality of blades 204*a-n* (where "a-n" indicates an integer number of blades) coupled to a chassis backbone 206. Each blade supports one or more virtual machines (VMs). As known to those skilled in the art of computers, a VM is a software implementation (emulation) of a physical computer. A single hardware computer (blade) can support multiple VMs, each running the same, different, or shared operating systems. In one embodiment, each VM can be specifically tailored and reserved for executing software tasks 1) of a particular type (e.g., database management, graphics, word processing etc.); 2) for a particular user, subscriber, client, group or other entity; 3) at a particular time of day or day of week (e.g., at a permitted time of day or schedule); etc.

As depicted in FIG. 5, blade 204*a* supports VMs 208*a-n* (where "a-n" indicates an integer number of VMs), and blade 204*n* supports VMs 210*a-n* (wherein "a-n" indicates an integer number of VMs). Blades 204*a-n* are coupled to a storage device 212 that provides a hypervisor 214, guest operating systems, and applications for users (not shown). Provisioning software from the storage device 212 allocates boot storage within the storage device 212 to contain the maximum number of guest operating systems, and associates applications based on the total amount of storage (such as that found within storage device 212) within the cloud. For example, support of one guest operating system and its associated applications may require 1 GByte of physical memory storage within storage device 212 to store the application, and another 1 GByte of memory space within storage device 212 to execute that application. If the total amount of memory storage within a physical server, such as boot storage device 212, is 64 GB, the provisioning software assumes that the physical server can support 32 virtual machines. This application can be located remotely in the network 216 and transmitted from the network attached storage 217 to the storage device 212 over the network. The global provisioning manager 232 running on the remote management node (Director Server) 230 performs this task. In this embodiment, the computer hardware characteristics are communicated from the VPD 151 to the VMPP 148. The VMPP 148 communicates the computer physical characteristics to the blade chassis provisioning manager 222, to the management interface 220, and to the global provisioning manager 232 running on the remote management node (Director Server) 230.

Note that chassis backbone 206 is also coupled to a network 216, which may be a public network (e.g., the Internet), a private network (e.g., a virtual private network or an actual internal hardware network), etc. Network 216 permits a virtual machine workload 218 to be communicated to a management interface 220 of the blade chassis 202. This virtual machine workload 218 is a software task whose execution, on any of the VMs within the blade chassis 202, is to request and coordinate deployment of workload resources with the management interface 220. The management interface 220 then transmits this workload request to a provisioning manager/management node 222, which is hardware and/or software logic capable of configuring VMs within the blade chassis 202 to execute the requested software task. In essence the virtual machine workload 218 manages the overall provisioning of VMs by communicating with the blade chassis management interface 220 and provisioning management node 222. Then this request is further communicated to the VMPP 148 in the computer system. Note that the blade chassis 202 is an exemplary computer environment in which the presently disclosed methods can operate. The scope of the presently disclosed system should not be limited to a blade chassis, however. That is, the presently disclosed methods can also be used in any computer environment that utilizes some type of workload management or resource provisioning, as described herein. Thus, the terms "blade chassis," "computer chassis," and "computer environment" are used interchangeably to describe a computer system that manages multiple computers/blades/servers.

Figure 6:
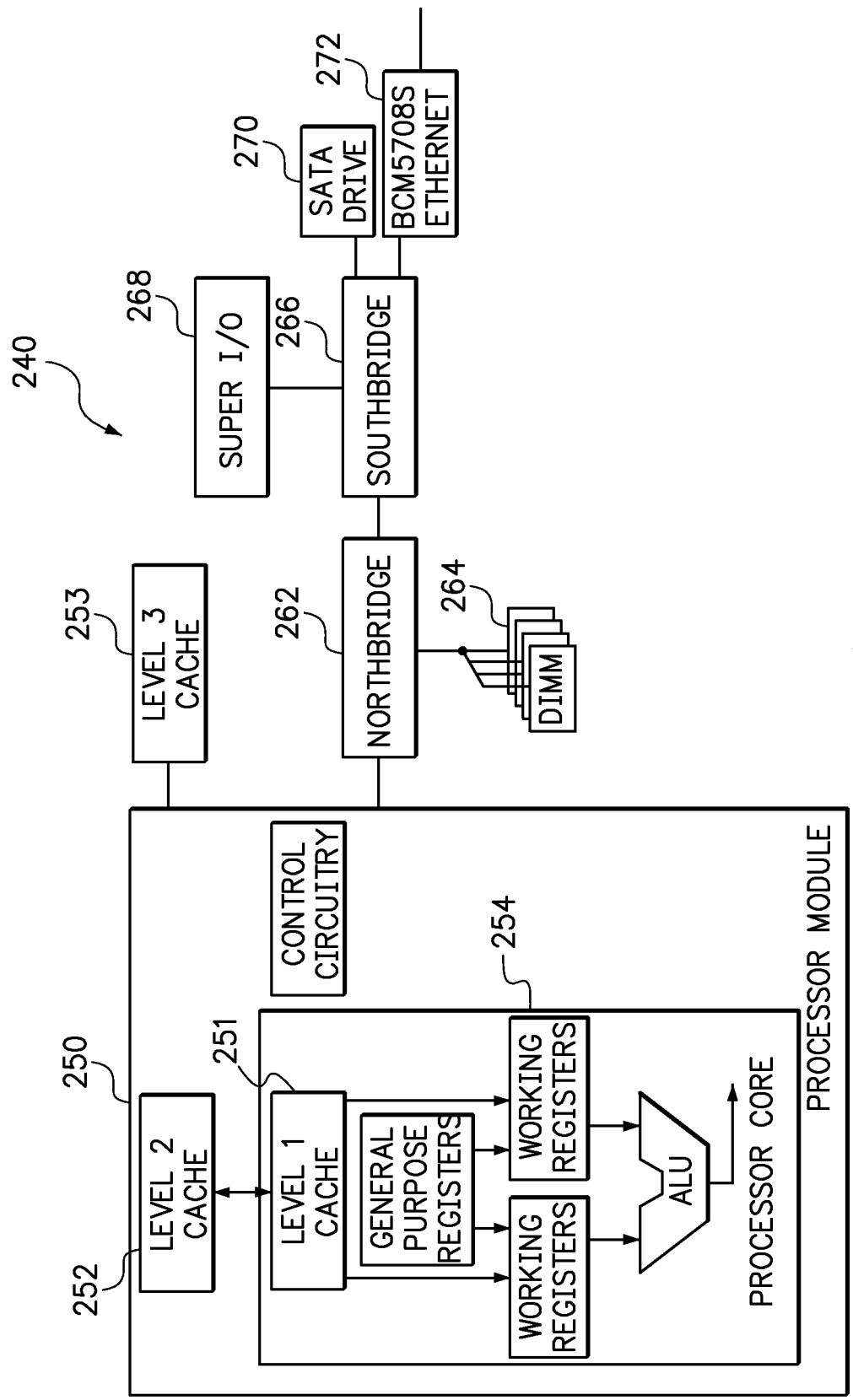
FIG. 6 depicts another embodiment of an exemplary computing node highlighting the cache in the processor module.

FIG. 6 depicts another embodiment of a generic server 240 highlighting the cache in the processor module. The processor module 250 communicates with a Northbridge 262 that provides access to main memory in the form of a series of dual in-line memory modules (DIMMs) 264. The Northbridge 262 also communicates with the Southbridge 266 which provides communication with various input/output devices, such as a Super I/O device 268 (for example providing a serial port, parallel port, keyboard port and mouse port), a Serial Advanced Technology Attachment (SATA) disk drive 270, and an Ethernet port 272.

FIG. 6 also shows the cache that is available to the processor in the server 240. The Level 1 cache 251 is local to the processor core 254 and can be accessed the fastest. The Level 2 cache 252 is still located on the processor module 250, but is further away from the core processor and although larger than the size of Level 1 cache is accessed slower. The Level 3 cache 253 is located off the processor module 250 and has more capacity, albeit at a slower access rate, than the Level 2 cache. If an instruction can access either Level 1, 2, or 3 cache, this operation results in a cache hit. Otherwise, the processor must go to external memory (DIMMs 264) to obtain the data resulting in a much longer instruction time. It is most efficient if instructions are able to use information in the Level 1 cache so that the data can be accessed immediately. Note that other elements such as Northbridge 262, Southbridge 266, Super I/O 268, the SATA drive 270 and the Ethernet interface 272 are included for completeness of the system design.

Embodiments of the invention track virtual machine application workloads, and their processor cache hit ratios. Then based on the cache hit ratios, use dynamic migration to move virtual machine workloads with a higher processor cache demand to physical servers with larger L1, L2 and/or L3 caches. Conversely, embodiments may identify virtual machine workloads with a lower cache appetite and migrate those virtual machine workloads to physical servers with more moderate L1, L2 and/or L3 cache sizes. Using this methodology results in increased utilization of physical servers and increased performance of cache-sensitive virtual machine workloads. More specifically, the cache demands of a virtual machine workload, in the form of cache hit ratio data, are obtained from the processors and provided to the provisioning manager 222 and ultimately to the global provisioning manager 232 (See FIG. 5). The global provisioning manager migrates high cache demand workloads to physical servers with larger cache.

The processor 254 has the ability to collect special performance counter data at run time, such as the total number of hits and the total number of memory accesses. Accordingly, when a particular virtual machine starts, the counters are reset to zero. When the virtual machine exits, the local hypervisor 214 reads the counters and generates a cache hit ratio (the total number of hits divided by the total number of memory accesses) for the period of time the software is executing. The local hypervisor may build and populate a performance data table for each virtual machine running in the physical server. Such data is also shared with the global provisioning manager, which collects such data from all physical servers in the migration domain.

FIG. 7 is a diagram illustrating certain data maintained by a global provisioning manager 232 (See also FIG. 5) in accordance with the present invention. This data is initially obtained by the local hypervisors that operate on a single physical server. Shown below is a suggested implementation for the hypervisor gathering the cache hit performance data:

(1) // * within the hypervisor
(2) turn on cache-hit performance counters in the processor (cache hits and memory accesses)
(3) schedule virtual machine workload A
(4) . . . elapsed time per counter specifications
(5) turn off cache-hit performance counter collection
(6) store virtual machine workload A performance counters for analysis—specifically analyze for cache hit ratios across L1, L2 and/or L3 cache.

The method would then consider the cache hit ratio of individual virtual machines and the cache sizes of the physical servers. The provisioning software in the cloud would gather this information from each local hypervisor. Since the provisioning manager already has tables of each physical servers' memory and cache sizes, the provisioning manager can move virtual machines to physical servers that allow better operation of the virtual machine. This method is feasible because the data for cache size is managed/maintained by the provisioning manager both as the provider of the cache size data and as a consumer of the cache size data. This means that the provisioning manager locally maintains this information as a consumer of cache. The global provisioning manager maintains cache size allocations at a physical server level and at a virtual machine level for the cloud. It is the global provisioning manager that decides whether, when and where to move a virtual machine.

The global provisioning manager 232 accesses a table, such as that shown in FIG. 7, including the L1, L2 and L3 cache hit ratios for each virtual machine. Optionally, the cache hit ratios are obtained from either the local hypervisor 214 or the provisioning manger 222, but the table shown includes the cache hits for the L1, L2 and L3 cache as well as the total number of memory accesses for each virtual machine on Physical Server #1. This raw data enables the global provisioning manager to calculate a set of class-specific hit ratios. For example, in Physical Server #1, the first virtual machine VM1 has an L1 cache hit ratio equal to the number of L1 cache hits (i.e., 800) divided by the total number of memory accesses (i.e., 1000). Accordingly, the L1 cache hit ratio is 0.80 (alternatively expressed as 80 percent). Since there were only 200 L1 misses (i.e., 1000 memory accesses minus 800 L1 cache hits), there are only 200 potential memory accesses to the L2 cache. The L2 cache hit ratio is, therefore, equal to the number of L2 cache hits (i.e., 160) divided by the 200 memory accesses to the L2 cache. Accordingly the L2 cache hit ratio is 0.80. Similarly, the L3 cache hit ratio of 0.25 is calculated by dividing the 10 L3 cache hits divided by the 40 L2 cache misses. By comparing the class-specific cache hit ratios with the respective threshold ratios, it is seen that the L1 and L2 cache hit ratios are greater than their respective threshold ratios, but the L3 cache hit ratio is less than the respective threshold ratio. In other words, there is an L3 cache hit ratio exception. As a result, the virtual machine VM1 is identified as a candidate for migration to another physical server. The selection of an appropriate target physical server is discussed in relation to FIG. 8.

FIG. 8 is a diagram illustrating vital product data for each of the physical servers in a migration domain. For the purposes of this example, the vital product data includes the size of the L1, L2 and L3 cache in each of six physical servers within the migration domain. In accordance with FIG. 7, the virtual machine VM1 on physical server #1 has been determined as having an L3 cache hit ratio exception, and is therefore a candidate for migration to another physical server. However, VM1 is only migrated if the migration domain includes a target physical that meets the appropriate conditions or policies. Though additional conditions or policies may also be required, this example of the method requires, as a first condition, that a target physical server have a greater amount of L3 cache than physical server 1, since VM1 experienced an L3 cache exception on physical server 1. The second condition requires that a target physical server have an equal or greater amount of L1 and L2 cache compared with the L1 and L2 cache of physical server 1.

In this example, only physical server 6 meets the foregoing required conditions, such that VM1 will be migrated from physical server 1 to physical server 6. As compared to physical server 1, physical server 2 has less L2 cache; physical server 3 has equal L1 and L2 cache, but less L3 cache; physical server 4 has the same L1, L2 and L3 cache; physical server 5 has greater L2 cache, but the same L1 and L3 cache; and physical server 6 has the same L2 cache and greater L1 and L3 cache. Although physical server 6 is the only server to meet the foregoing conditions, alternate embodiments might include conditions that would allow migration to physical server 5 since physical server 5 has the same L1 and L3 cache as physical server 1, but also has twice the amount of L2 cache. Therefore, migration of VM1 to physical would not directly address the L3 cache hit ratio exception, but the additional L2 cache might reduce the load on the L3 cache.

Figure 9:
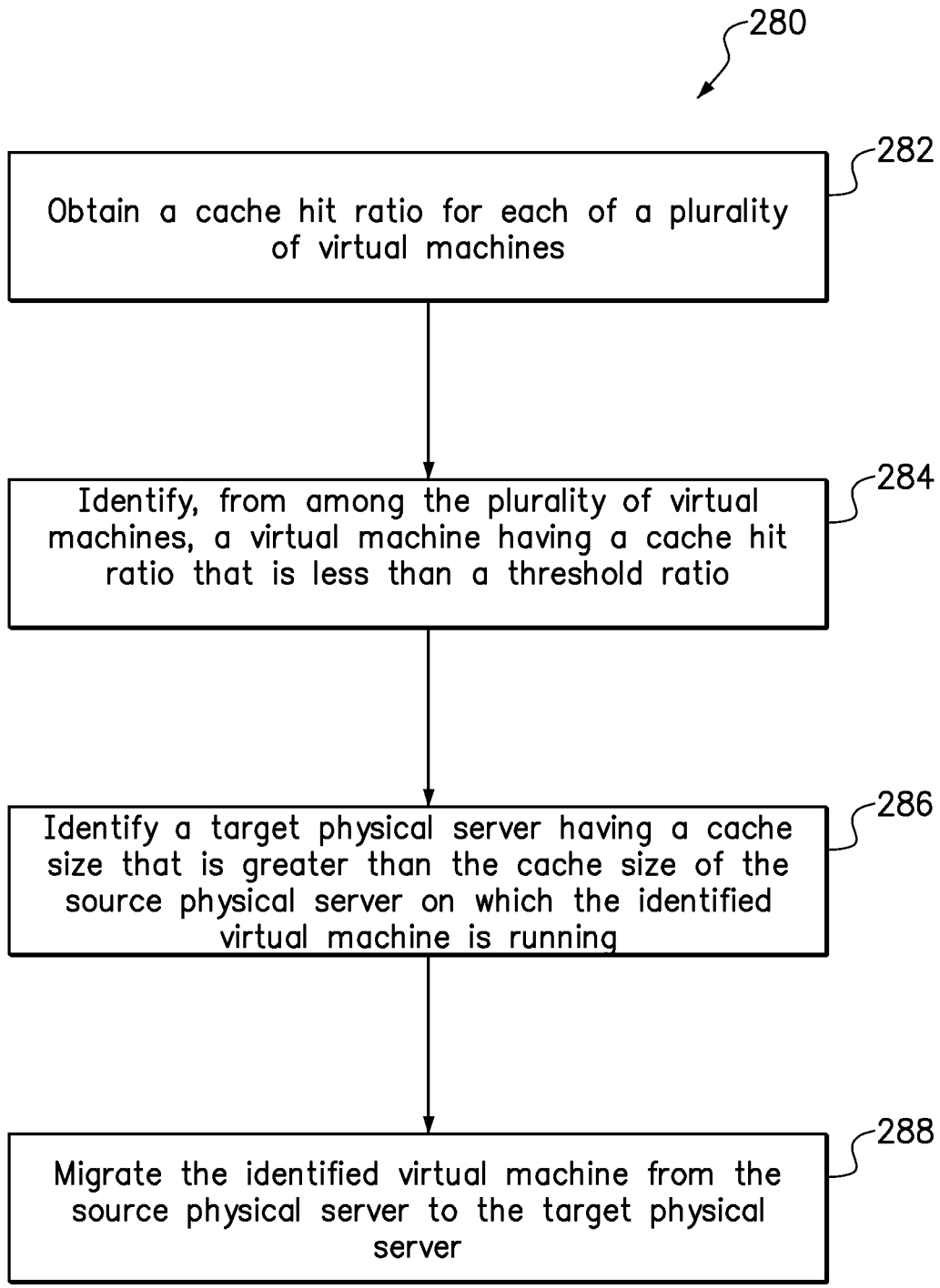
FIG. 9 is a flowchart of a first embodiment of a method of dynamically migrating a virtual machine on the basis of a cache hit ratio threshold exception.

FIG. 9 is a flowchart of a first method 280 of dynamically migrating a virtual machine on the basis of a cache hit ratio threshold exception. In step 282, the method obtains a cache hit ratio for each of a plurality of virtual machines. Step 284 identifies, from among the plurality of virtual machines, a virtual machine having a cache hit ratio that is less than a threshold ratio. Step 286 identifies a target physical server having a cache size that is greater than the cache size of the source physical server on which the identified virtual machine is running. Then, the identified virtual machine is migrated from the source physical server to the target physical server in step 288.

Figure 10A:
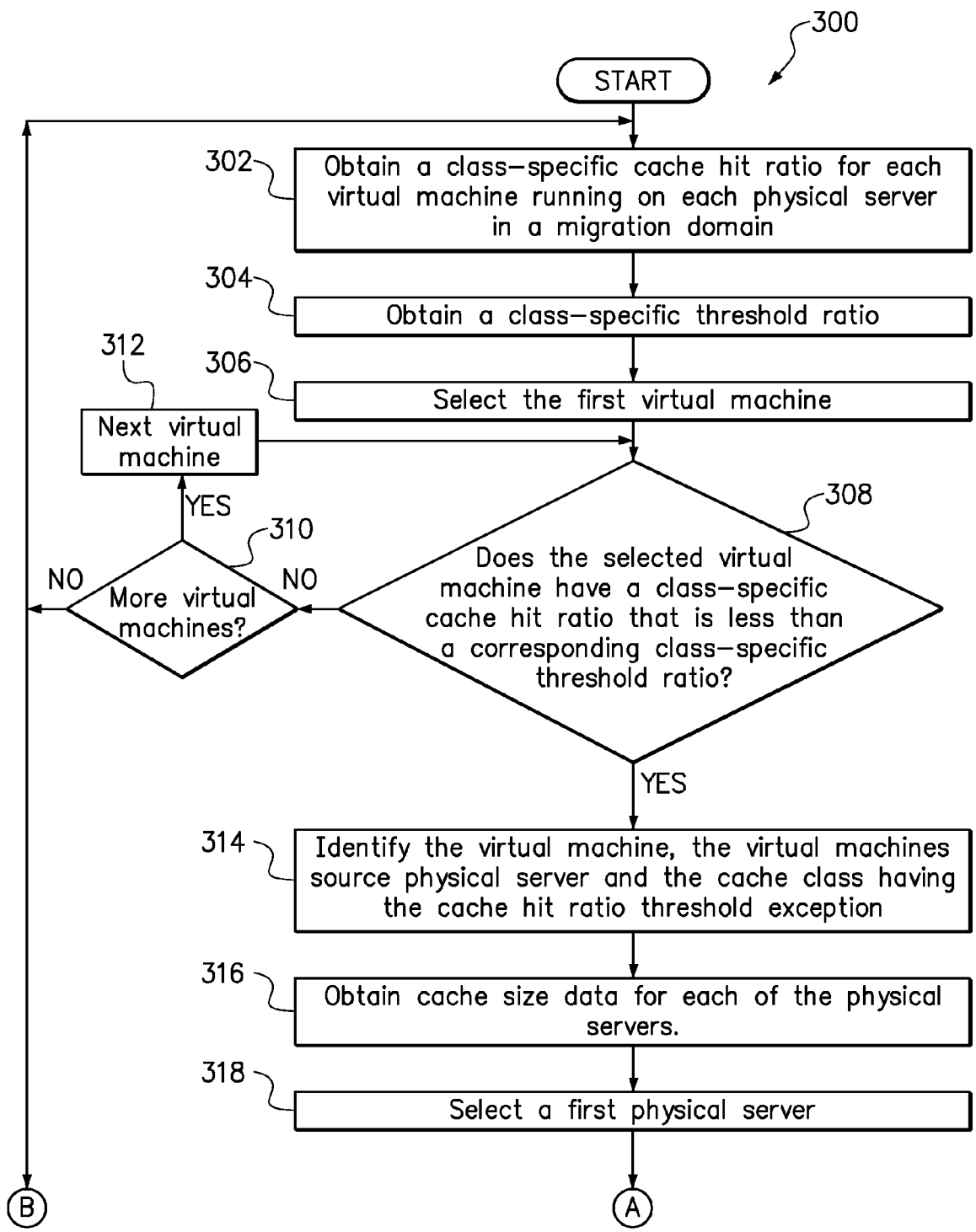
FIGS. 10A-10B provide a flowchart of a second, more specific embodiment of a method of dynamically migrating a virtual machine on the basis of a cache hit ratio threshold exception.
Figure 10B:
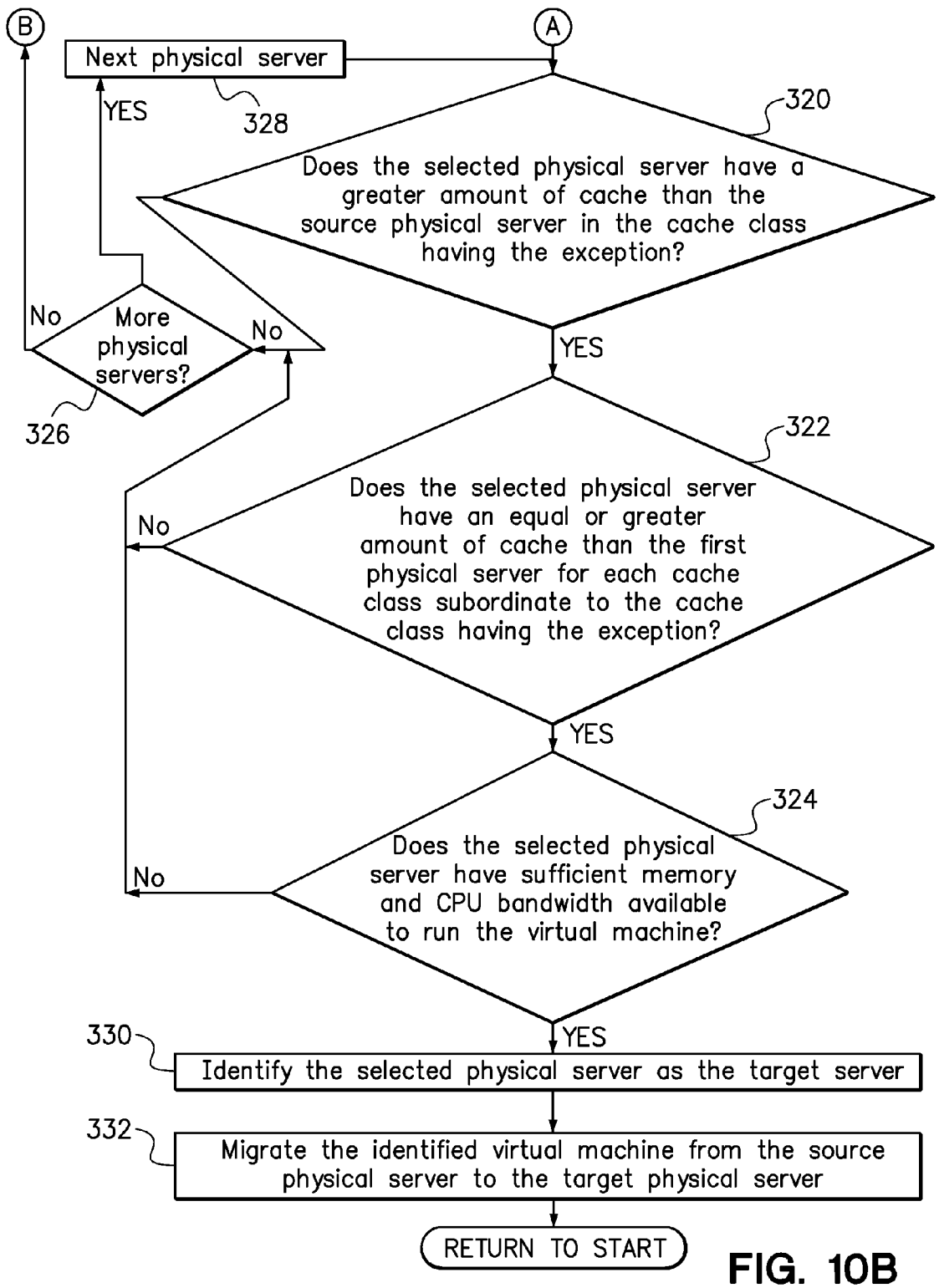

FIGS. 10A-10B provide a flowchart of a second, more specific embodiment of a method 300 of dynamically migrating a virtual machine on the basis of a cache hit ratio threshold exception. A class-specific cache hit ratio is obtained for each virtual machine running on each physical server in a migration domain in step 302, a class-specific threshold ratio is obtained in step 304, and a first virtual machine is selected in step 306. Then, in step 308, it is determined whether the selected virtual machine has a class-specific cache hit ratio that is less than a corresponding class-specific threshold ratio. If not, then step 310 determines if there are more virtual machines to analyze for a cache hit ratio threshold exception. If there are more virtual machines to analyze, then step 312 increments to the next virtual machine and returns the process to step 308. If all virtual machines have been analyzed without any virtual machine having a cache hit ratio threshold exception, then the process moves from step 310 back to the beginning. A positive determination in step 308, however, leads to step 314 which identifies the virtual machine, the virtual machine's source physical server, and the cache class having the cache hit ratio threshold exception. Step 316 obtains cache size data for each of the physical servers, and step 318 selects a first physical server for analysis in accordance with FIG. 10B.

In FIG. 10B, steps 320, 322, and 324 provide three conditions that must be satisfied in order to identify a target physical server in step 330. Step 320 determines whether the selected physical server has a greater amount of cache than the source physical server in the cache class having the exception. Step 322 determines whether the selected physical server has an equal or greater amount of cache than the first physical server for each cache class subordinate to the cache class having the exception. Then, step 324 determines whether the selected physical server has sufficient memory and CPU bandwidth available to run the virtual machine. If the determinations in these three steps 320, 322, and 324 are each positive, then step 330 identifies the selected physical server as the target physical server and step 332 migrates the identified virtual machine from the source physical server to the target physical server. However, if any of the three determinations in steps 320, 322, and 324 are negative, then the process moves to step 326. In step 326, it is determined if there are other physical servers to be considered in finding a target server. If additional physical server should be considered, then the process increments to the next physical server in step 328 before returning to step 320. Still, if all servers have been considered without having identified a target server, then the process returns to the beginning.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in one or more computer-readable storage medium having computer-usable program code stored thereon.

Any combination of one or more computer usable or computer readable storage medium(s) may be utilized. The computer-usable or computer-readable storage medium may be, for example but not limited to, an electronic, magnetic, electromagnetic, or semiconductor apparatus or device. More specific examples (a non-exhaustive list) of the computer-readable medium include: a portable computer diskette, a hard disk, random access memory (RAM), read-only memory (ROM), an erasable programmable read-only memory (EPROM or Flash memory), a portable compact disc read-only memory (CD-ROM), an optical storage device, or a magnetic storage device. The computer-usable or computer-readable storage medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer-usable or computer-readable storage medium may be any storage medium that can contain or store the program for use by a computer. Computer usable program code contained on the computer-usable storage medium may be communicated by a propagated data signal, either in baseband or as part of a carrier wave. The computer usable program code may be transmitted from one storage medium to another storage medium using any appropriate transmission medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method, comprising:
   obtaining a cache hit ratio for each of a plurality of virtual machines;
   identifying, from among the plurality of virtual machines, a first virtual machine having a cache hit ratio that is less than a threshold ratio, wherein the first virtual machine is running on a first physical server; and
   migrating the first virtual machine from the first physical server having a first cache size to a second physical server having a second cache size that is greater than the first cache size.

2. The computer-implemented method of claim 1, further comprising:
   determining an average cache hit ratio for all virtual machines; and
   calculating the threshold ratio as being a predetermined percentage below the average cache hit ratio.

3. The computer-implemented method of claim 1, further comprising:
   obtaining cache size data for each of the physical servers.

4. The computer-implemented method of claim 3, wherein the cache size data for each physical server is obtained as vital product data of each physical server.

5. The computer-implemented method of claim 1, further comprising:
   migrating a second virtual machine off of the second physical server.

6. The computer-implemented method of claim 5, wherein the second virtual machine is determined to have the lowest rate of memory accesses among all the virtual machines running on the second physical server.

7. The computer-implemented method of claim 1, wherein identifying a first virtual machine having a cache hit ratio that is less than a threshold ratio, further comprises:
   obtaining a class-specific cache hit ratio for each of a plurality of cache classes available to the first virtual machine on the first physical server; and
   comparing, for each of the plurality of cache classes, the class-specific cache hit ratio to the threshold ratio, wherein the first virtual machine is identified as having a cache hit ratio that exceeds the threshold ratio in response to determining that one or more of the class-specific cache hit ratios is less than the threshold ratio.

8. The computer-implemented method of claim 7, wherein the class-specific cache hit ratio for the first virtual machine is the percentage of memory accesses that are available in the particular cache class excluding memory accesses satisfied by any subordinate cache.

9. The computer-implemented method of claim 7, wherein the plurality of cache classes includes L1 cache and L2 cache.

10. The computer-implemented method of claim 7, wherein the plurality of cache classes includes L1 cache, L2 cache and L3 cache.

11. The computer-implemented method of claim 7, further comprising:
obtaining a cache hit ratio for each of a plurality of virtual machines running on the first physical server.

12. The computer-implemented method of claim 7, wherein comparing, for each of the plurality of cache classes, the class-specific cache hit ratio to the threshold ratio, further comprises:
comparing, for each of the plurality of cache classes, the class-specific cache hit ratio to a class-specific threshold ratio for the same cache class, wherein the first virtual machine is identified as having a cache hit ratio that exceeds the threshold ratio in response to determining that one or more of the class-specific cache hit ratios is less than the class-specific threshold ratio for the same cache class.

13. The computer-implemented method of claim 12, further comprising:
determining a class-specific average cache hit ratio for all virtual machines within a migration domain; and
calculating the class-specific threshold ratio as being a predetermined percentage below the class-specific average cache hit ratio.

14. The computer-implemented method of claim 7, further comprising:
selecting the second physical server to receive the first virtual machine from the first physical server, wherein the second physical server is determined to have a greater amount of cache than the first physical server in the cache class having a class-specific cache hit ratio less than the threshold ratio.

15. The computer-implemented method of claim 14, wherein the second physical server is determined to have an equal or greater amount of cache than the first physical server for each cache class that is subordinate to the cache class having a class-specific cache hit ratio less than the threshold ratio.

16. The computer-implemented method of claim 15, wherein the second physical server is determined to have sufficient memory and CPU bandwidth available to run the virtual machine.

17. A computer program product including computer usable program code embodied on a non-transitory computer usable storage medium, the computer program product including:
computer usable program code for obtaining a cache hit ratio for each of a plurality of virtual machines;
computer usable program code for identifying, from among the plurality of virtual machines, a first virtual machine having a cache hit ratio that is less than a threshold ratio, wherein the first virtual machine is running on a first physical server; and
computer usable program code for migrating the first virtual machine from the first physical server having a first cache size to a second physical server having a second cache size that is greater than the first cache size.

18. The computer program product of claim 17, further comprising:
computer usable program code for determining that the second physical server has an equal or greater amount of cache than the first physical server for each cache class that is subordinate to the cache class having a class-specific cache hit ratio less than the threshold ratio.

19. The computer program product of claim 17, further comprising:
computer usable program code for determining an average cache hit ratio for all virtual machines; and
computer usable program code for calculating the threshold ratio as being a predetermined percentage below the average cache hit ratio.

20. The computer program product of claim 17, further comprising:
computer usable program code for obtaining cache size data for each of the physical servers.

21. The computer program product of claim 17, further comprising:
computer usable program code for obtaining a class-specific cache hit ratio for each of a plurality of cache classes available to the first virtual machine on the first physical server; and
computer usable program code for comparing, for each of the plurality of cache classes, the class-specific cache hit ratio to the threshold ratio, wherein the first virtual machine is identified as having a cache hit ratio that exceeds the threshold ratio in response to determining that one or more of the class-specific cache hit ratios is less than the threshold ratio.

22. The computer program product of claim 21, wherein the class-specific cache hit ratio for the first virtual machine is the percentage of memory accesses that are available in the particular cache class excluding memory accesses satisfied by any subordinate cache.

23. The computer program product of claim 21, further comprising:
computer usable program code for selecting the second physical server to receive the first virtual machine from the first physical server, wherein the second physical server is determined to have a greater amount of cache than the first physical server in the cache class having a class-specific cache hit ratio less than the threshold ratio.

24. The computer program product of claim 21, wherein the computer usable program code for comparing, for each of the plurality of cache classes, the class-specific cache hit ratio to the threshold ratio, further comprises:
computer usable program code for comparing, for each of the plurality of cache classes, the class-specific cache hit ratio to a class-specific threshold ratio for the same cache class, wherein the first virtual machine is identified as having a cache hit ratio that exceeds the threshold ratio in response to determining that one or more of the class-specific cache hit ratios is less than the class-specific threshold ratio for the same cache class.

25. The computer program product of claim 24, further comprising:
computer usable program code for determining a class-specific average cache hit ratio for all virtual machines within a migration domain; and
computer usable program code for calculating the class-specific threshold ratio as being a predetermined percentage below the class-specific average cache hit ratio.

* * * * *